July 11, 1939.    B. A. MIKKELSON    2,166,015
TWO-IN-ONE WEED PULLER AND HOE
Filed April 6, 1938
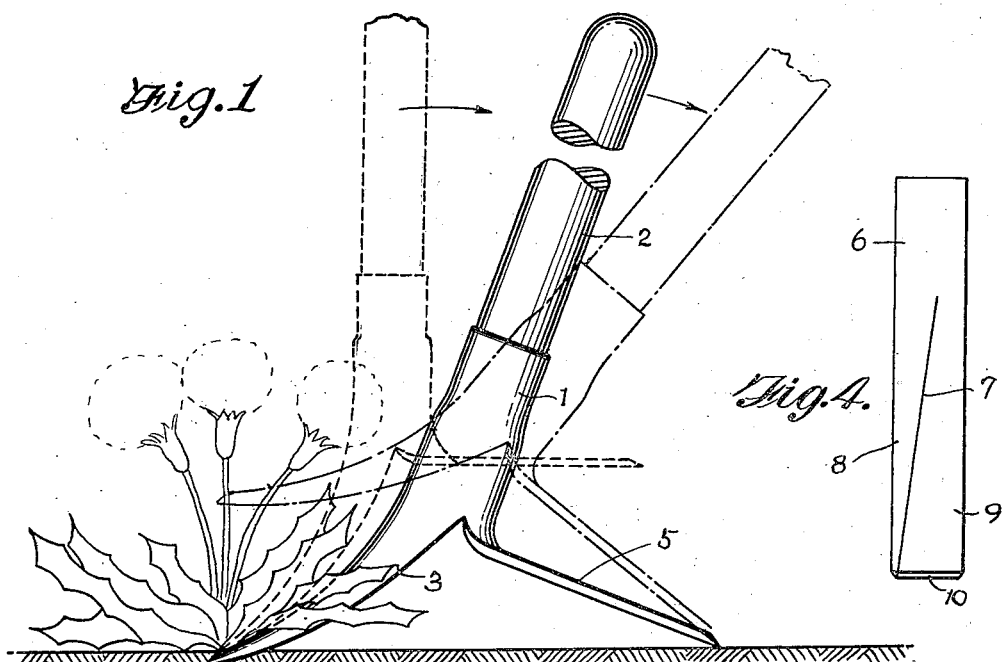
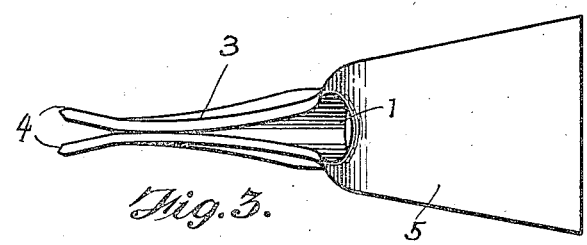
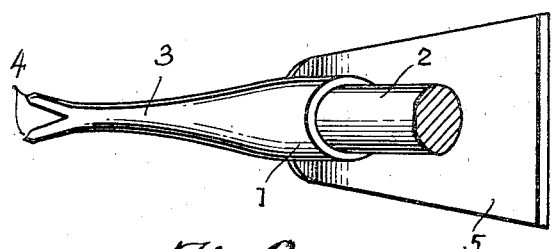
Inventor
Berent A. Mikkelson.
E. W. Anderson & Son.
By
Attorney Patented July 11, 1939

2,166,015

UNITED STATES PATENT OFFICE 2,166,015

TWO-IN-ONE WEED PULLER AND HOE

Berent A. Mikkelson, Seattle, Wash.

Application April 6, 1938, Serial No. 200,534

3 Claims. (Cl. 254—132)

The invention relates to weed pullers, and has for an object the provision of an improved device of this description which will be of greater efficiency and of such simplicity that it may be made and sold at a small price.

The invention consists in the novel construction and combinations of parts as hereinafter set forth in the claims.

In the accompanying drawing, illustrating an embodiment of the invention:

Figure 1 is a side view of the invention, shown in full lines in position as in use, first and third positions taken being shown in dotted lines.

Figure 2 is a top plan view of the invention.

Figure 3 is a bottom plan view of the same.

Figure 4 is a detail side view of the blank used.

In the drawing, the numeral 1 designates the tubular shank adapted to receive a handle 2, said shank having at one side of the lower end thereof a continuously downwardly and forwardly extending spike 3 having at its free end divergent prongs 4 and at the opposite side of the lower end thereof a rearwardly extending flat blade 5, adapted to be used as a foot rest in pressing said spike into the ground, said blade having a straight sharpened outer edge 10 adapted to take a secure stationary fulcrum bearing on the surface of the ground, said spike being located as a whole at an angle of approximately forty-five degrees to said shank and said blade being located at right angles to the shank, whereby a minimum degree of tilting of the device following the pressing of the spike into the ground is required to engage said prongs or bifurcations with the weed tap root, bring said fulcrum edge into contact with the ground and to extract the weed and said divergent bifurcations are maintained against retreat from their root engagement.

In the use of the device, the tool is first placed in approximately vertical position alongside a weed to be pulled with handle in front, the substantially horizontally positioned blade being then stepped on to press the spike 3 into the ground close to the tap root of the weed and sufficiently to penetrate the crown of leaves which in the case of a dandelion lie close to the ground, second the device is tilted to bring the divergent bifurcations 4 into embracing engagement with the weed root immediately below said crown of leaves and to simultaneously bring the fulcrum edge 5 into contact with the ground, and third the tilting is continued to extract the weed, the three positions stated being shown in Figure 1.

The device is adapted to be made of a blank such as a short length of metal pipe 6, shown in Figure 4, the lower end portion of said blank being obliquely slit or divided at 7 to provide two divisions 8 and 9 tapering in opposite directions, one of which is substantially pointed and the other of which has an extended lower edge 10, the parts 7 and 8 being bent to provide the aforesaid spike 3 and blade 5.

It is to be understood that the invention is not limited to the precise details of construction shown and described, as obvious modifications will occur to a person skilled in the art. The blade 5 is also adapted to be used as a hoe blade.

I claim:

1. In a weed puller, a shank having at one side of the lower end thereof a continuously downwardly and forwardly extending spike having lower bifurcations and at the opposite side of the lower end thereof a rearwardly extending flat blade adapted to be used as a foot rest in pressing said spike into the ground, said blade having a straight sharpened outer edge adapted to take a secure stationary fulcrum bearing on the ground in tilting the device to engage said bifurcations with a weed tap root, bring said fulcrum edge into contact with the ground and to extract the weed, said spike being located as a whole at an angle of approximately forty-five degrees to said shank and said blade being located at right angles to the shank, whereby a minimum degree of tilting of the device following pressing the spike into the ground is required in extracting the weed.

2. In a weed puller, a shank having at one side of the lower end thereof a continuously downwardly and forwardly extending spike having lower divergent bifurcations and at the opposite side of the lower end thereof a rearwardly extending flat blade adapted to be used as a foot rest in pressing said spike into the ground, said blade having a straight sharpened outer edge adapted to take a secure stationary fulcrum bearing on the ground in tilting the device to engage said bifurcations with a weed tap root, bring said fulcrum edge into contact with the ground and to extract the weed, said spike being located as a whole at an angle of approximately forty-five degrees to said shank and said blade being located at right angles to the shank, whereby a minimum degree of tilting of the device following pressing the spike into ground is required in extracting the weed and said divergent bifurcations are maintained against retreat from their root engagement.

3. A blank for a weed puller composed of a short straight piece of metal, having an obliquely divided lower end portion to provide two divisions tapering in opposite directions and one of which is substantially pointed and the other of which is provided with an extended lower edge.

BERENT A. MIKKELSON.